(12) United States Patent
Kowalske et al.

(10) Patent No.: US 8,340,582 B1
(45) Date of Patent: Dec. 25, 2012

(54) METHOD FOR DETECTING CENTER-FREQUENCY-TUNED SIGNALS IN THE PRESENCE OF OFF-TUNED SIGNALS AND NOISE USING HIGHER ORDER STATISTICS

(75) Inventors: Kyle E. Kowalske, Columbia, MD (US); Charles S. Bendall, El Cajon, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 189 days.

(21) Appl. No.: 13/042,602

(22) Filed: Mar. 8, 2011

(51) Int. Cl.
*H04B 17/00* (2006.01)
(52) U.S. Cl. .................... 455/63.1; 455/226.1
(58) Field of Classification Search ........... 455/63.1, 455/67.11, 67.13, 67.14, 150.1, 161.1, 226.1, 455/226.2, 226.3; 375/222, 224, 295, 344
See application file for complete search history.

(56) References Cited

U.S. PATENT DOCUMENTS

| | | | |
|---|---|---|---|
| 6,313,620 B1 | 11/2001 | Richardson et al. | |
| 7,046,964 B1 * | 5/2006 | Sullivan et al. | 455/67.11 |
| 7,525,942 B2 | 4/2009 | Cordone | |
| 7,986,672 B2 * | 7/2011 | Tiedemann et al. | 455/67.13 |
| 8,112,039 B2 * | 2/2012 | Bertagna | 455/63.1 |

\* cited by examiner

*Primary Examiner* — Thanh Le
(74) *Attorney, Agent, or Firm* — Kyle Eppele; J. Eric Anderson

(57) ABSTRACT

A method of distinguishing center-frequency-tuned signals from off-tuned signals and noise in a single-channel receiver, comprising: receiving a signal with the single-channel receiver; storing the signal in a memory store; calculating the variance of a time-windowed segment of the signal; storing data representing the variance of the segment in the memory store; calculating the kurtosis of the segment of the signal; storing data representing the kurtosis of the segment in the memory store; comparing the variance data and the kurtosis data to variance and kurtosis thresholds respectively; identifying the segment as center-frequency-tuned if the variance of the segment exceeds the variance threshold and the kurtosis falls below the kurtosis threshold; and identifying the segment as non-center-frequency-tuned if the variance of the segment is less than or equal to the variance threshold and/or the kurtosis is greater than or equal to the kurtosis threshold.

15 Claims, 9 Drawing Sheets

METHOD FOR DETECTING CENTER-FREQUENCY-TUNED SIGNALS IN THE PRESENCE OF OFF-TUNED SIGNALS AND NOISE USING HIGHER ORDER STATISTICS

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice: (619) 553-5118; email: ssc_pac_t2@navy.mil. Reference Navy Case Number 100838.

BACKGROUND OF THE INVENTION

This invention relates to methods for distinguishing specific hop frequency signals from off-tuned signals and noise in a frequency hopping environment. In some cases, the bandwidth of a desired center-frequency-tuned hop overlaps with an off-tuned hop making it difficult to detect center-tuned pulses and to distinguish between these pulses and any interference or noise. Interference could be similar pulses from different emitters or off-tuned pulses. For example, use of frequency hopping in the ISM band often encounters interference from other frequency hopping signals in the same shared frequency band. Previous techniques to overcome such interference have been developed for multi-channel receivers, which have parallel channels for each frequency hop, to distinguish which hop is being transmitted. These techniques are based on identifying the receiver channel having the highest power, in other words, detecting energy levels in order to detect the burst of signal energy. It is expensive to have a multiple channel receiving system.

SUMMARY

Disclosed herein is a method of distinguishing center-frequency-tuned signals from off-tuned signals and noise within an output of a single-channel receiver, comprising the following steps: (1) receiving a signal with the single-channel receiver and transforming the signal into an output signal; (2) storing the output signal as a series of data points in a memory store; (3) calculating the variance of a time-windowed segment of the stored output signal, wherein the variance equals the second central moment of the segment; (4) storing data representing the variance of the segment in the memory store; (5) calculating the kurtosis of the segment of the output signal, wherein the kurtosis equals the ratio of the fourth central moment to the variance squared minus three; (6) storing data representing the kurtosis of the segment in the memory store; (7) comparing the variance data and the kurtosis data to variance and kurtosis thresholds respectively; (8) identifying the segment as center-frequency-tuned if the variance of the segment exceeds the variance threshold and the kurtosis falls below the kurtosis threshold; and (9) identifying the segment as non-center-frequency-tuned if the variance of the segment is less than or equal to the variance threshold and/or the kurtosis is greater than or equal to the kurtosis threshold.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
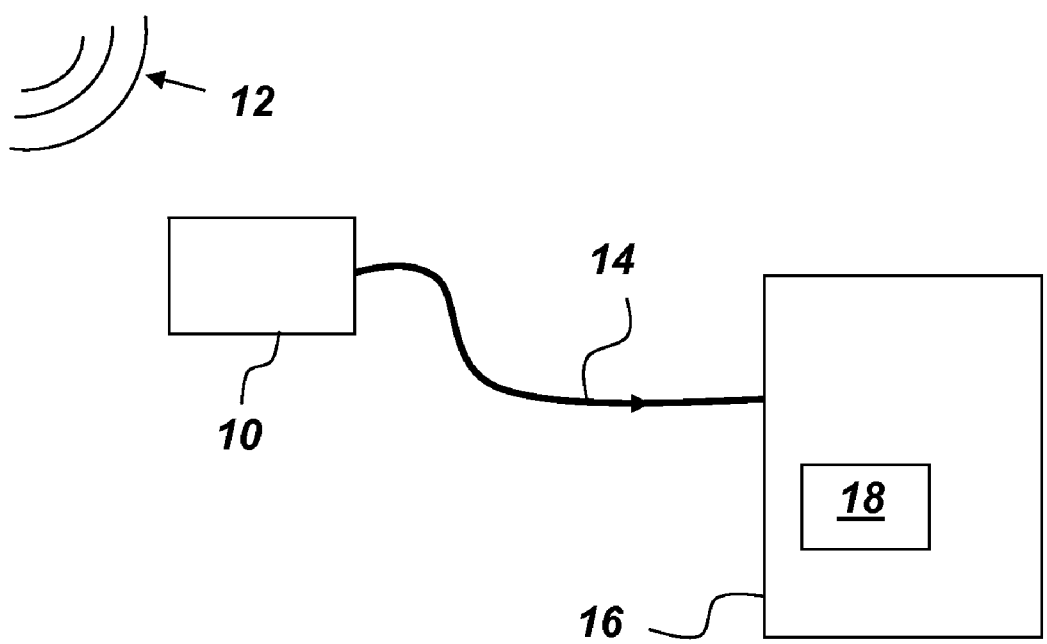
FIG. 1 is a block diagram showing a single channel receiver receiving an incoming signal.

FIG. 1 is a block diagram showing a single channel receiver 10 receiving an incoming signal 12. The output signal 14 of the single channel receiver 10 is conducted to a computer 16. The output signal 14 is then stored in a memory store 18. The single channel receiver 10 may be a band pass filter or any receiver capable of receiving a center-frequency-tuned signal and partial off-tuned signals. In other words, in a frequency-hopping scenario, the receiver 10 has sufficient bandwidth to capture one of the hopping center frequencies as well as partial band up-tuned and partial band down-tuned frequency hops that are also present in the receiver bandwidth. The incoming signal 12 may be any type of signal burst. The computer 16 may be any processor capable of calculating the kurtosis and variance of a series of data points. The memory store 18 may be any non-transitory computer-readable storage medium internal or external to the computer 16.

Figure 2:
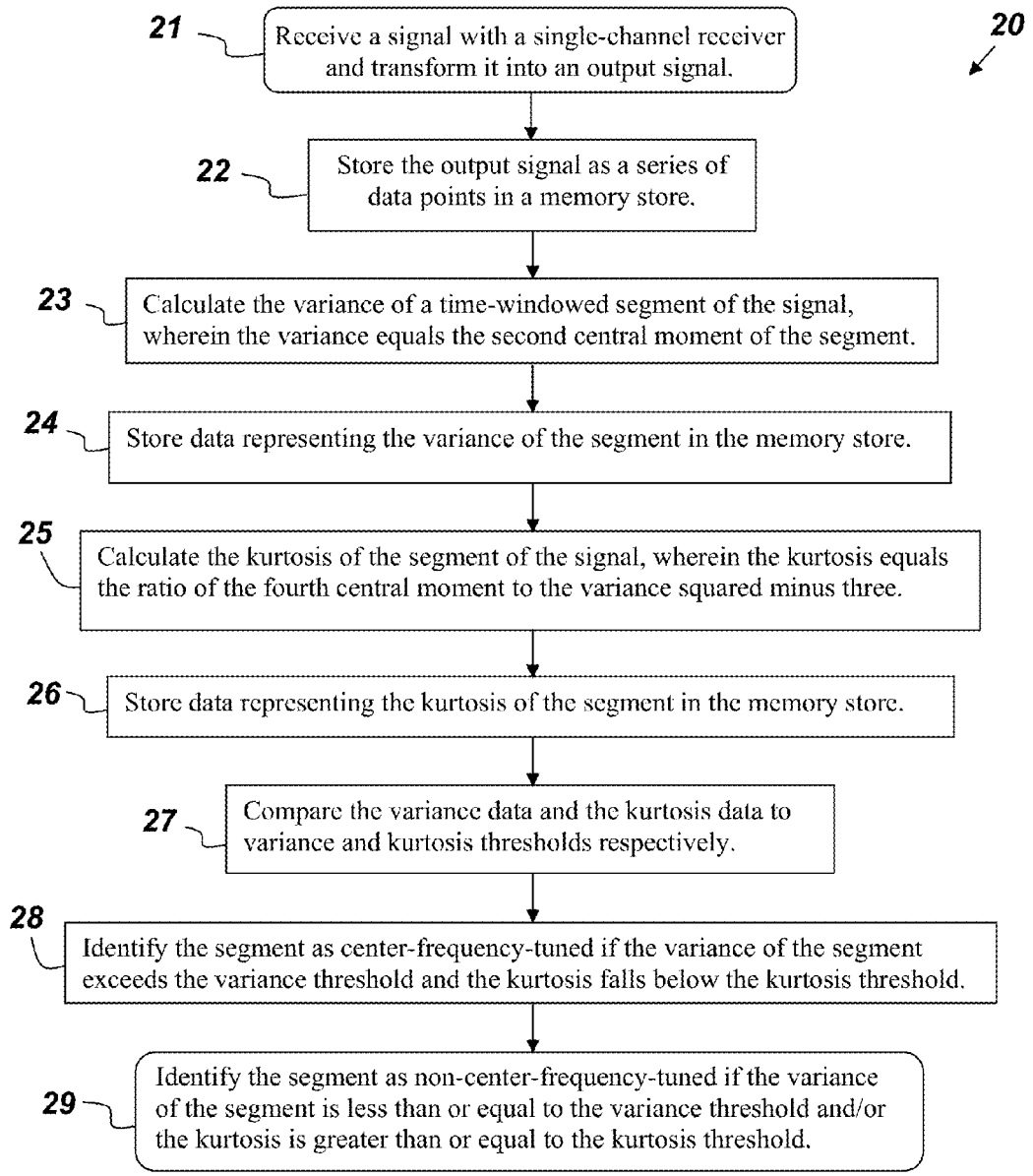
FIG. 2 is a flowchart of a method for distinguishing center-frequency-tuned signals from off-tuned signals and noise with a single-channel receiver.

FIG. 2 is a flowchart of a method 20 for distinguishing center-frequency-tuned signals from off-tuned signals and noise with the single-channel receiver 10. Step 21 provides for receiving the signal 12 with the single-channel receiver 10 and transforming the signal 12 into the output signal 14. Next, in step 22, the output signal 14 is stored as a series of data points in the memory store 18. Step 23 provides for calculating the variance of a time-windowed segment of the stored output signal 14. The variance of the time-windowed segment of the stored signal equals the second central moment of the segment. Then, in step 24, data representing the variance is stored in the memory store 18. Step 25 provides for calculating the kurtosis of the segment of the signal. Then, in step 26, data representing the kurtosis of the segment is stored in the memory store 18. Step 27 provides for respectively comparing the variance data and the kurtosis data to variance and kurtosis thresholds. The segment is identified as center-frequency-tuned in step 28 if the variance of the segment exceeds the variance threshold and the kurtosis falls below the kurtosis threshold. Alternatively, the segment is identified as non-center-frequency-tuned in step 29 if the variance of the segment is less than or equal to the variance threshold and/or the kurtosis is greater than or equal to the kurtosis threshold.

Figure 3A:
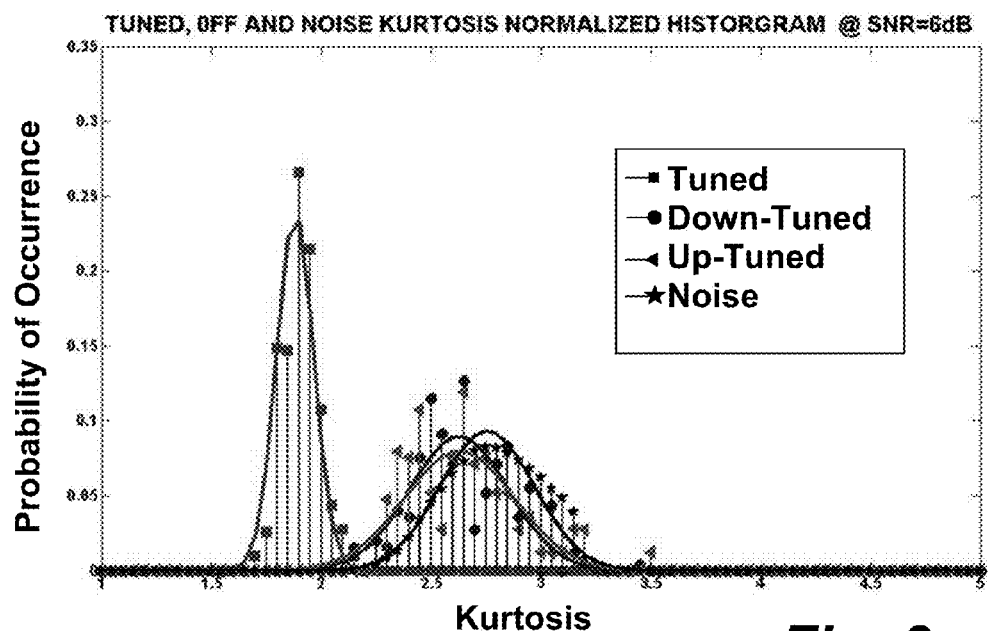
FIG. 3a is a plot depicting the probability of occurrence of various kurtosis values of a signal.
Figure 3B:
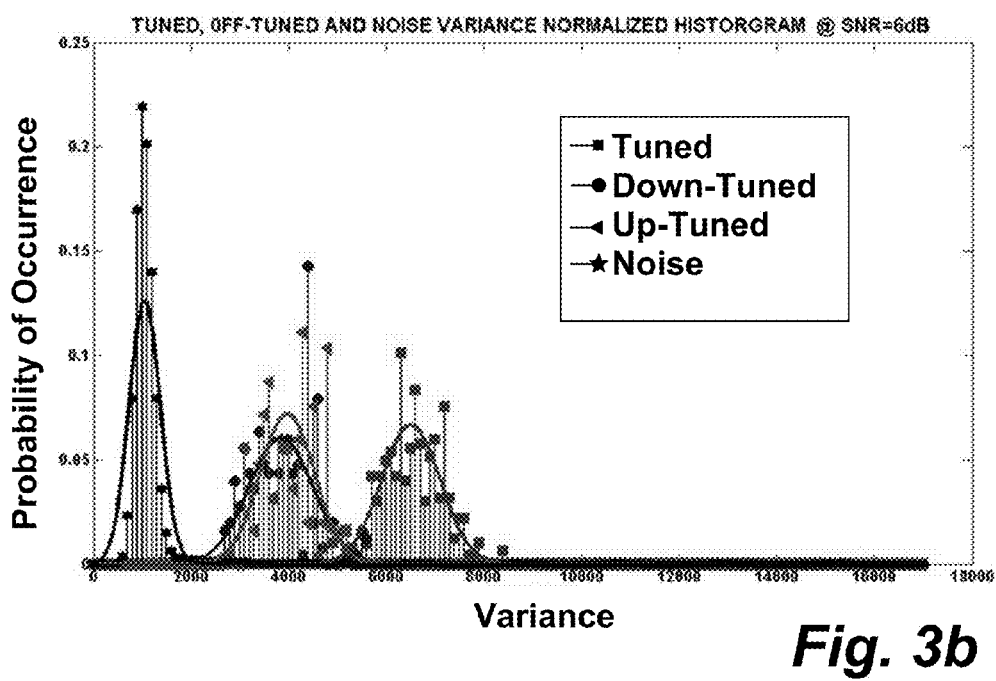
FIG. 3b is a plot showing the probability of occurrence of various variance values of a signal.

FIG. 3a is a plot depicting the probability distribution of kurtosis values of a center-frequency-tuned segment, off-tuned segments (both up-tuned and down-tuned), and noise only segments of a given output signal 14 having a signal to noise ratio of six dB. As shown in FIG. 3a, the kurtosis of the center-frequency-tuned segment is lower than the off-tuned segments and the noise. FIG. 3b shows the probability distribution of variance values of a center-frequency-tuned segment, off-tuned segments (both up-tuned and down-tuned), and noise only segments of the same output signal 14 utilized in FIG. 3a. As shown in FIG. 3b, the variance of the center-frequency-tuned segment is higher than the variance of the noise and the off-tuned segments. The noise only case has the lowest variance, which can be used to minimize false detections produced by a higher kurtosis threshold.

Figure 4:
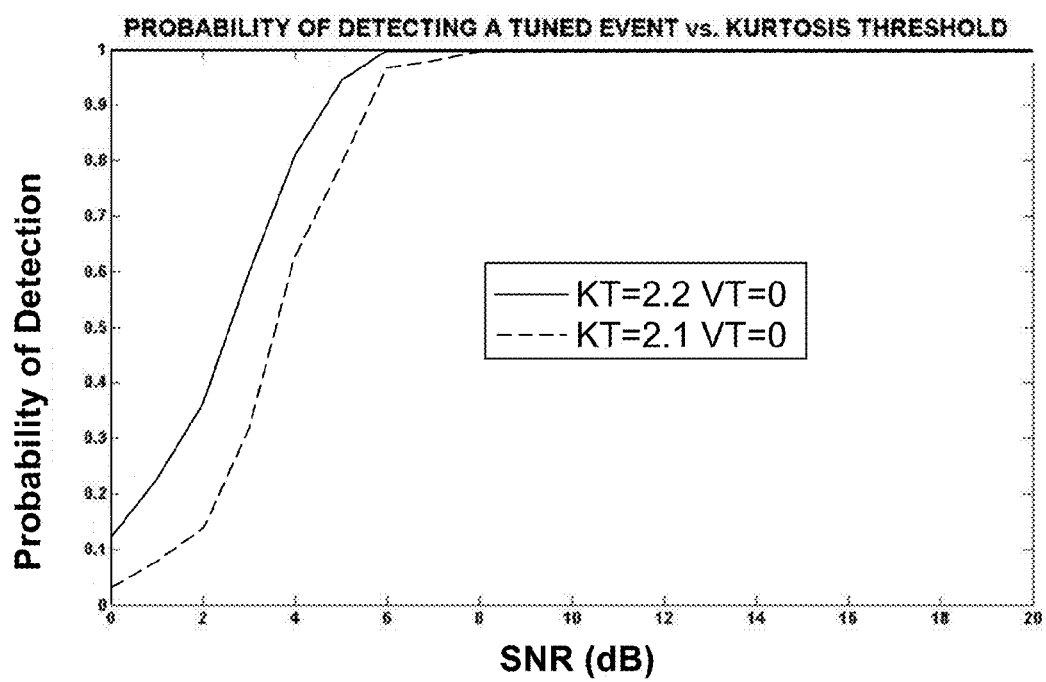
FIG. 4 is a plot of the probabilities of detecting a center-frequency-tuned signal using two different kurtosis thresholds.

FIG. 4 is a plot of the probabilities of detecting a center-frequency-tuned signal using two different kurtosis thresholds, namely 2.1 (lower curve) and 2.2 (upper curve). Raising the kurtosis threshold detects more center-frequency-tuned signal bursts, but it allows more noise only events to be classified as center-frequency-tuned segments. The variance threshold is necessary to eliminate these false alarms.

Figure 5A:
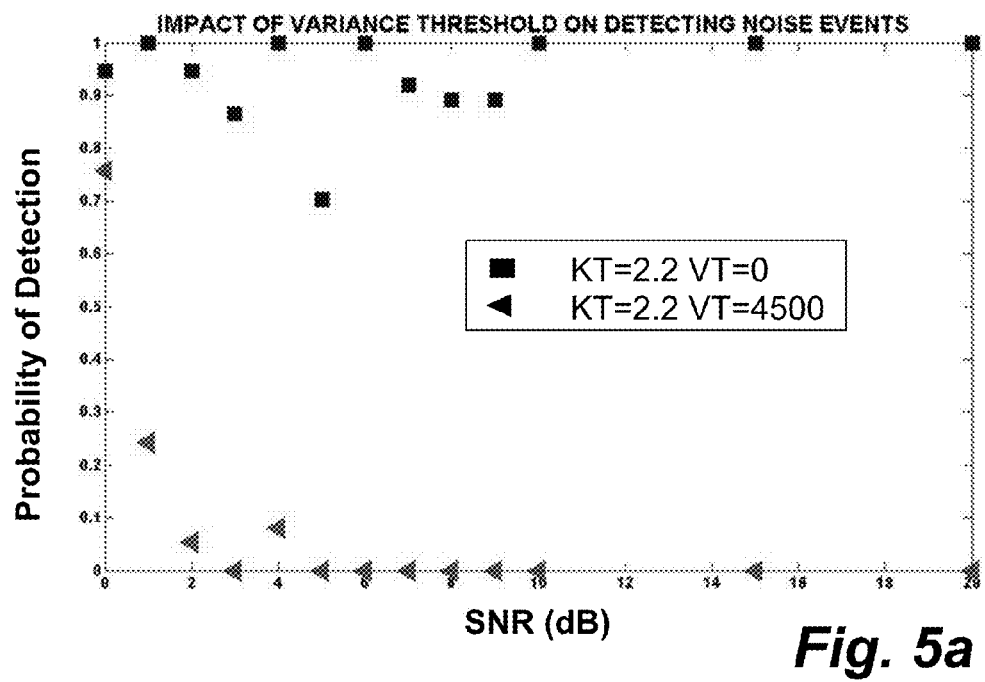
FIG. 5a is a plot of the probability of detecting noise events for a given kurtosis threshold and two variance thresholds.

FIG. 5a is a plot of the probability of false alarms from a noise only event for a kurtosis threshold of 2.2 as a function of a signal to noise ratio under two variance threshold scenarios, (1) where the variance threshold equals zero, and (2) where the variance threshold equals 4500. Setting the variance threshold to 4500 eliminates most of the noise only events that had a kurtosis lower than 2.2 that otherwise would have been classified as center-frequency-tuned signals without a variance threshold.

Figure 5B:
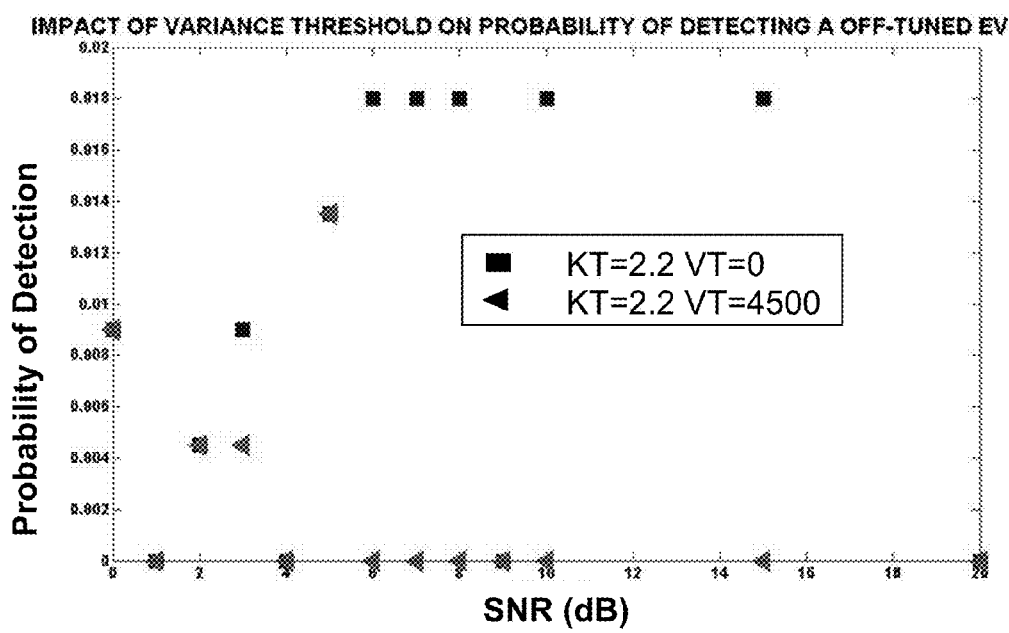
FIG. 5b is a plot of the probability of detecting off-tuned events for a given kurtosis threshold and two variance thresholds.

FIG. 5b is a plot of the probability of false alarms due to a down-tuned or up-tuned event meeting a Kurtosis threshold condition of 2.2 with and without a Variance threshold. The false alarm probability is small in each case but the use of a variance threshold does provide some improvement. The combined threshold conditions provide a significant improvement over the Kurtosis threshold only condition.

The kurtosis is a measure of the "peakedness" of a probability distribution of a real-valued random variable. Kurtosis, as utilized in method 20, may be defined in one of two ways. First, the kurtosis may be defined as the ratio of the fourth central moment to the variance squared. Alternatively, the kurtosis may be defined as the ratio of the fourth central moment to the variance squared minus three so that a Gaussian distribution has a kurtosis of zero (see Equation 1 below). Either definition is acceptable for the purposes of method 20 with a factor of three (3) subtracted from the kurtosis threshold if the alternative definition is used.

$$g_2 = \frac{m_4}{m_2^2} - 3 = \frac{\frac{1}{n}\sum_{i=1}^{n}(x_i - \overline{x})^4}{\left(\frac{1}{n}\sum_{i=1}^{n}(x_i - \overline{x})^2\right)^2} - 3 \qquad \text{Eq. (1)}$$

where $g_2$ is the kurtosis, $m_2$ is the variance, $m_4$ is the fourth central moment, n is the summation limit, $x_i$ is an $i^{th}$ signal value, and x is the mean signal value. The summation limit ("n") in Eq. 1 may be selected to isolate the output signal 14 from a given noise background and to highlight the structural difference between tuned and off-tuned frequency hops.

The length of the time window n may be set depending on the expected characteristics of the output signal 14. For example, the time window n may be set to approximately equal the expected length of the signal burst. In another embodiment, the time window n may be set to approximately twice the expected length of the signal burst. Setting the time window n to approximately equal the length of the signal burst appears to improve the probability of successfully distinguishing between center-frequency-tuned signals, noise, and off-tuned signals.

The time-window is stepped through the stored output signal 14 and new kurtosis and variance values are calculated at each step. The resulting kurtosis values are determined by Equation 2 which is a modified version of Equation 1 to describe stepping the time-window through the stored output signal 14. Equation 2 also allows for gaps between consecutive time-window segments. In Equation 2, N is the length of the time-windowed signal sequence; "i" is the index that runs from the first point to the last point in the time-windowed signal sequence; "M" is the number of points to skip between consecutive time-windowed sequences (note that if M=1 then there are no gaps between time-windowed signal sequences); and "j" is the time-windowed signal sequence index.

$$g_2(j) = \frac{\frac{1}{N}\sum_{i=(j-1)M+1}^{N+(j-1)M}(x_i - \overline{x})^4}{\left[\frac{1}{N}\sum_{i=(j-1)M+1}^{N+(j-1)M}(x_i - \overline{x})^2\right]^2} - 3 \qquad \text{Eq. (2)}$$

In this example, as mentioned above, the output signal consisted of a number of random hops at several carrier frequencies and the impact of noise was simulated by adding Gaussian white noise to the output signal with a noise variance appropriate for a desired signal-to-noise ratio (SNR). Statistics may be developed by running several trials with randomly added noise for each trial.

As desired, the output signal 14 may also be down-sampled. The amount of down-sampling depends on the expected center-frequency-tuned signal characteristics and structure. The output signal 14, depicted in Equation 3 as "S," may be considered to be a sequence of signal values ($s_1$ to $s_\pi$) with a total length of $\pi$ points $$S = s_1, s_2, s_3, \ldots, s_\pi \qquad \text{Eq. 3}$$

The down sampled single (DS) is a subset of the signal S such that DS is derived from S by the following relationship:

$$DS = s_a, s_{a+k}, s_{a+2}k, \ldots, s_{a+nk} = ds_1, ds_2 \ldots ds_{n+1} \qquad \text{Eq. 4}$$

Where

"a" is an arbitrary starting point in the signal sequence S. Typically "a" is the first point in the signal sequence S;

k is a constant by which "a" is increased to obtain the next element in the signal sequence S to be included in the down sampled sequence DS. Note that if "k" is equal to one (1) there is no down sampling; and "n" is an arbitrary integer, but (a+nk) must be less than the length $\pi$ of the signal sequence S. Typically "n" is chosen such that (a+(n+1)k) is greater than $\pi$. The $x_i$ in Equation 2 may be either the elements of the signal sequence S or the down sampled signal sequence DS.

Figure 6A:
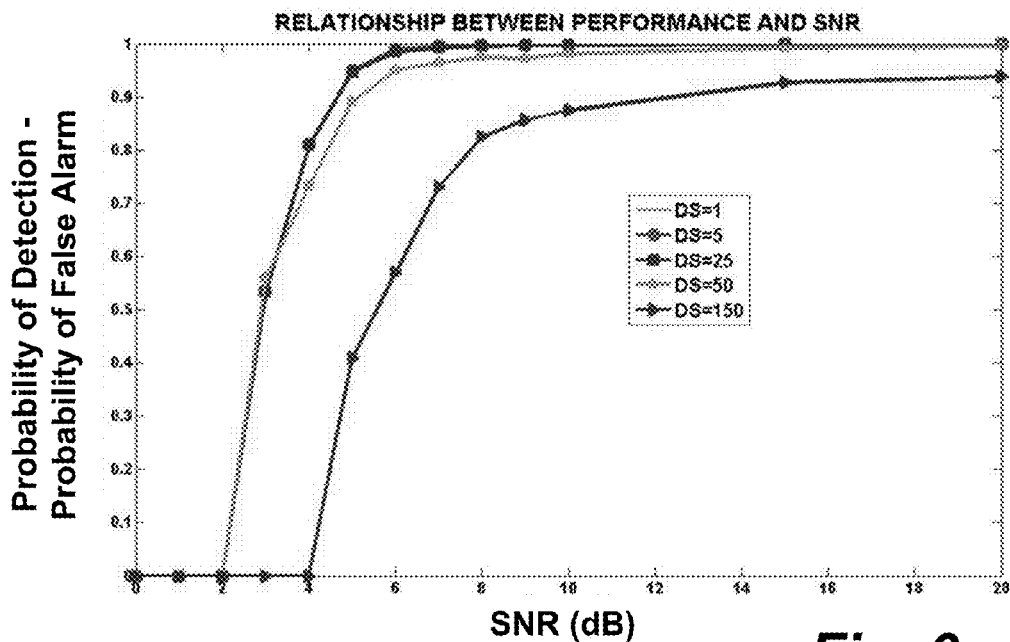
FIG. 6a is a plot showing the probability of detection minus the probability of false alarm plotted against signal to noise ratio for five different down sample sizes.

FIG. 6a shows a plot of the probability of detection minus the probability of false alarm for five different down sample sizes: 1 (i.e. no down sampling), 5, 25, 50 and 150 points. To speed up the calculations, in addition to down sampling, the kurtosis may be calculated at intervals (see "M" in Equation 2). For example, in one embodiment, we used intervals of 25 for a down sampling of 1, intervals of 5 for a down sampling of 5 and intervals of 1 for a down sampling of 25, 50 and 150. This approach results in kurtosis sequences of equal length for down samples of 1, 5 and 25. The kurtosis sequence length for down samples of 50 and 150 were ½ and ⅙ of the kurtosis sequence length at a down sampling of 1.

Figure 6B:
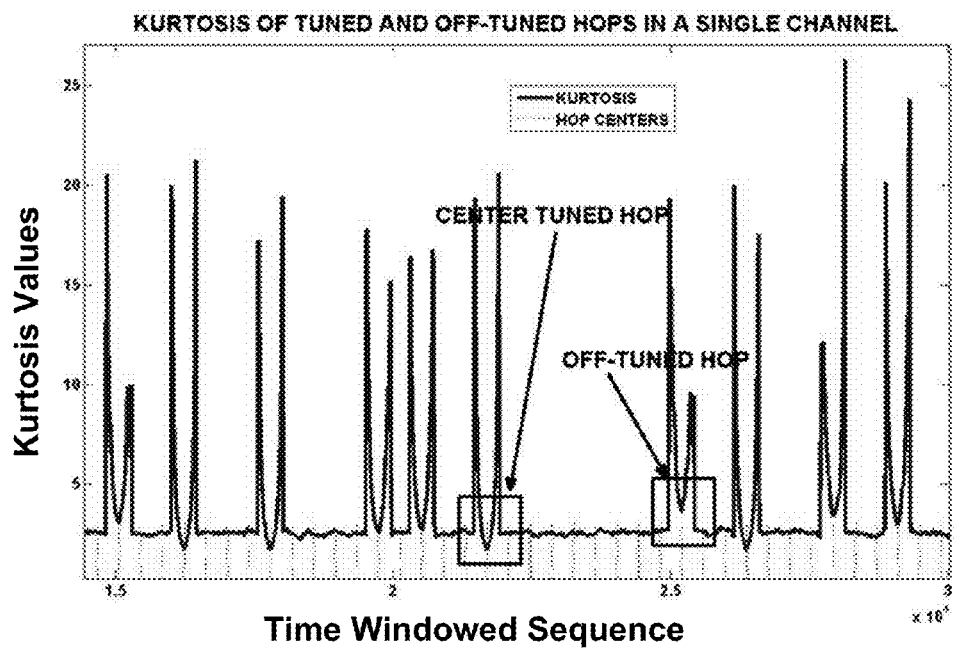
FIG. 6b shows the kurtosis values for a sequence of hops processed through a single channel receiver.

FIG. 6b shows the kurtosis values as calculated by method 20 for a sequence of hops processed through a single channel receiver 10. The dashed vertical lines at the bottom mark the hop locations. Hops lying outside the bandpass of the receiver are filtered out. Only center-tuned hops and off-tuned hops lying partially in the bandpass have significant Kurtosis values. The maximum Kurtosis values of center-tuned and off-tuned hops can be equal and cannot be used to distinguish center and off-tuned hops, but the center-tuned Kurtosis values drop below the noise level while the off-tuned Kurtosis values remain about the noise level. In FIG. 6b, the arrows point to the dips.

FIGS. 7a-9b provide various statistics obtained by running a number of trial cases on the same test signal. At the beginning of each trial noise was added to the raw signal data before filtering with the single channel receiver 10 and calculating the Kurtosis vector. Thirty seven trials were performed except for the 0 dB SNR case in which only 21 trials were conducted. There were twelve tuned hops, six down-tuned hops and six up-tuned hops at the hop carrier frequency utilized in the analysis. This produced a total of 504 tuned samples and 504 off-tuned samples. For down samples of 1, 5 and 25, the minimum value within ±100 samples of the comb center was used as the Kurtosis value for the each hop. For down samples of 50 and 150 the number of sample range was adjusted to ±50 and ±17. The 201, 101 or 35 samples around the tuned and off-tuned hop locations were discarded and the remaining points were considered as noise. The mean and variance of all the 504 tuned Kurtosis hops were calculated at each SNR. This tuned mean and variance was compared to the minimum up-tuned, down-tuned and noise Kurtosis value measured at each SNR value. This procedure was performed at each of the down sample sizes and for summation limits of 4800 and 6000 points. The expected signal burst within this test signal without down sampling had an expected duration of approximately 4800 points. The results for a down sample of 1, 25 and 50 are shown in FIGS. 7a-9b. Several conclusions are evident from the plots in FIGS. 7a-9b.

Figure 7A:
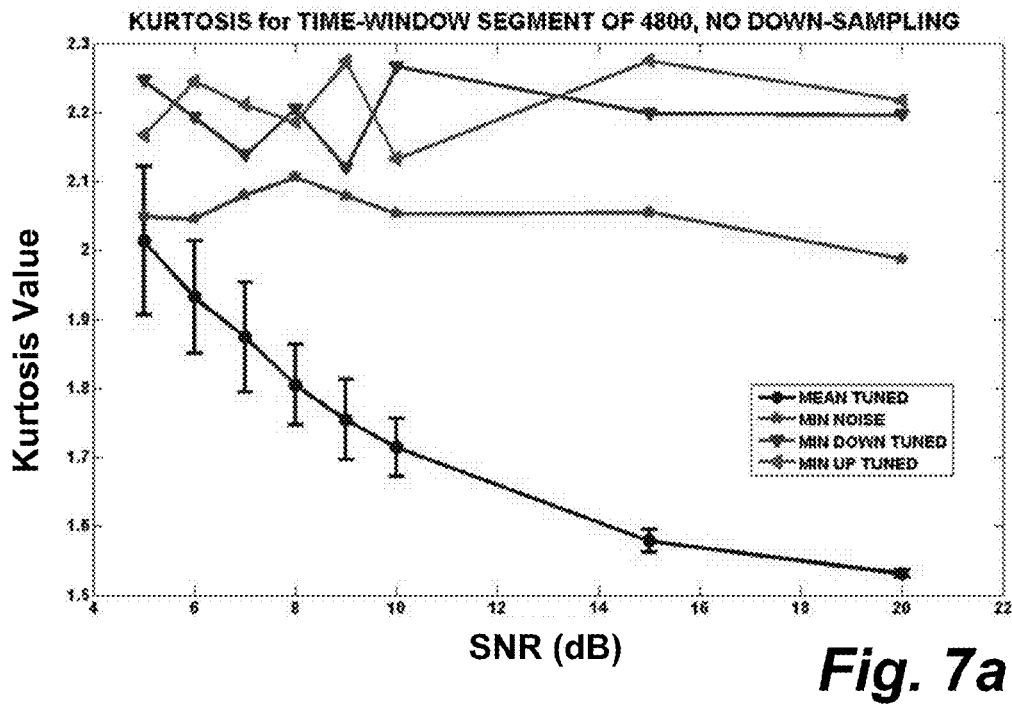
FIGS. 7a-7b are plots of a tuned kurtosis mean and standard deviation for various signals at different time windows and no down-sampling.
Figure 7B:
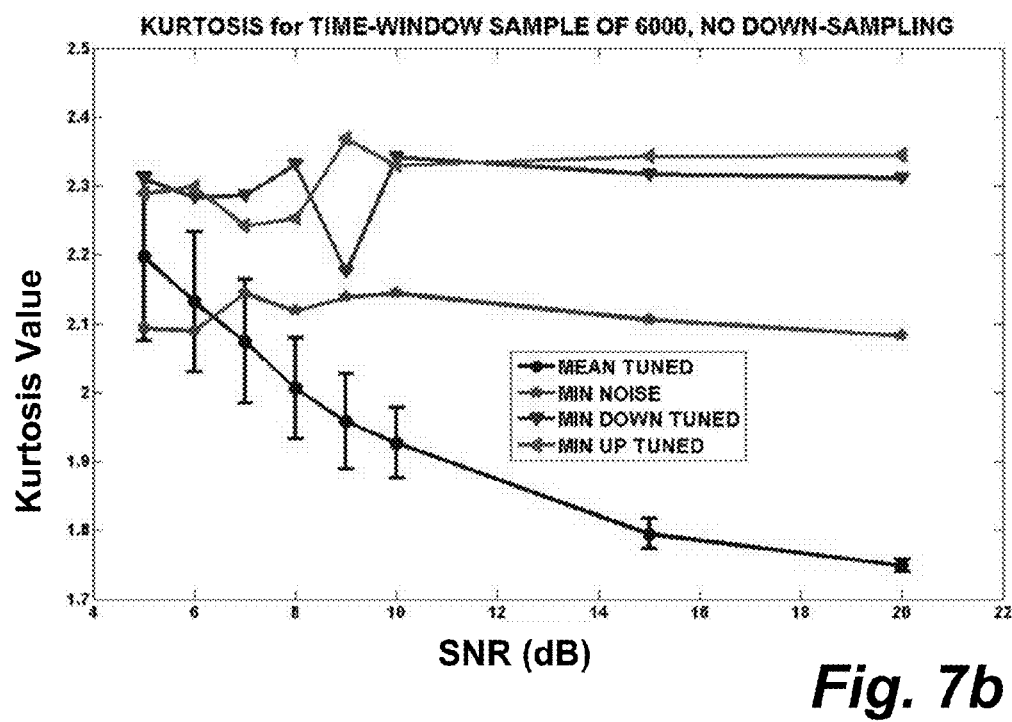
Figure 8A:
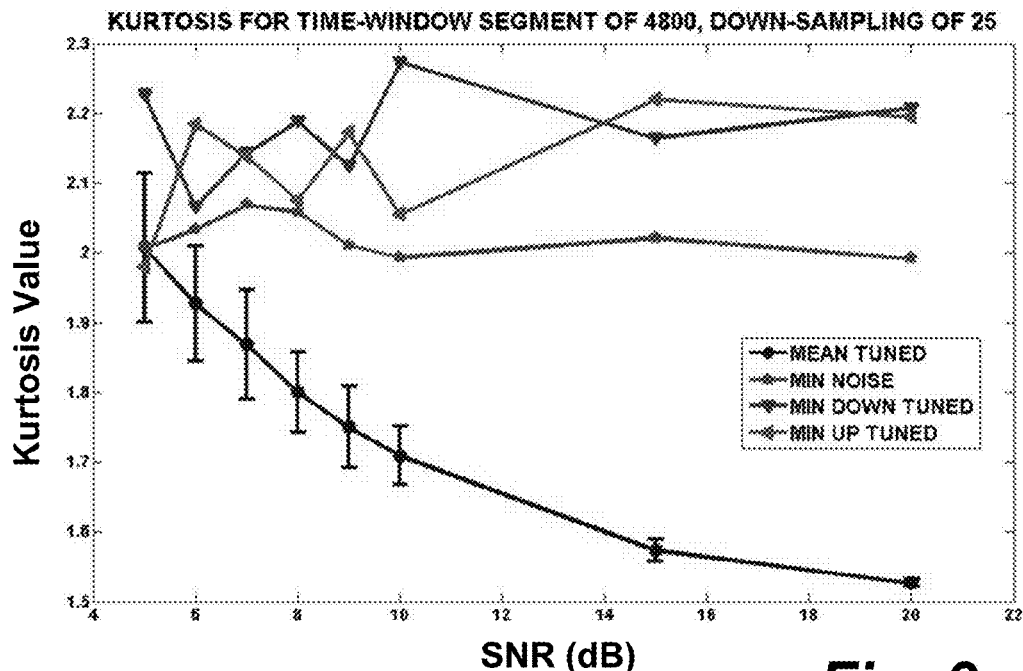
FIGS. 8a-8b are plots of a tuned kurtosis mean and standard deviation for various signals at different time windows and a down sample size of 25.
Figure 8B:
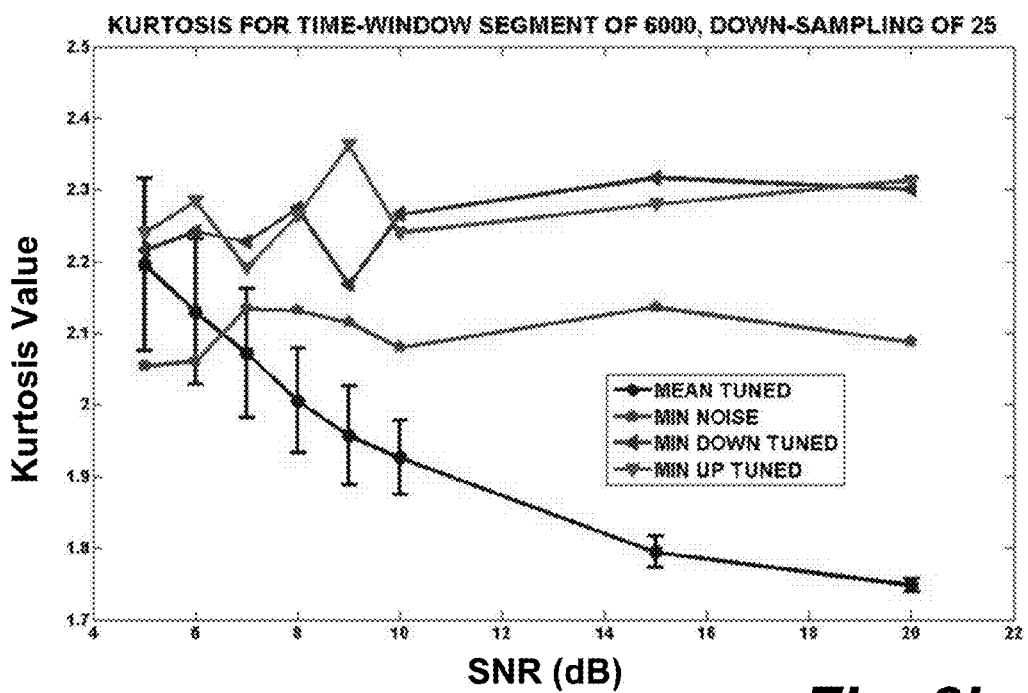
Figure 9A:
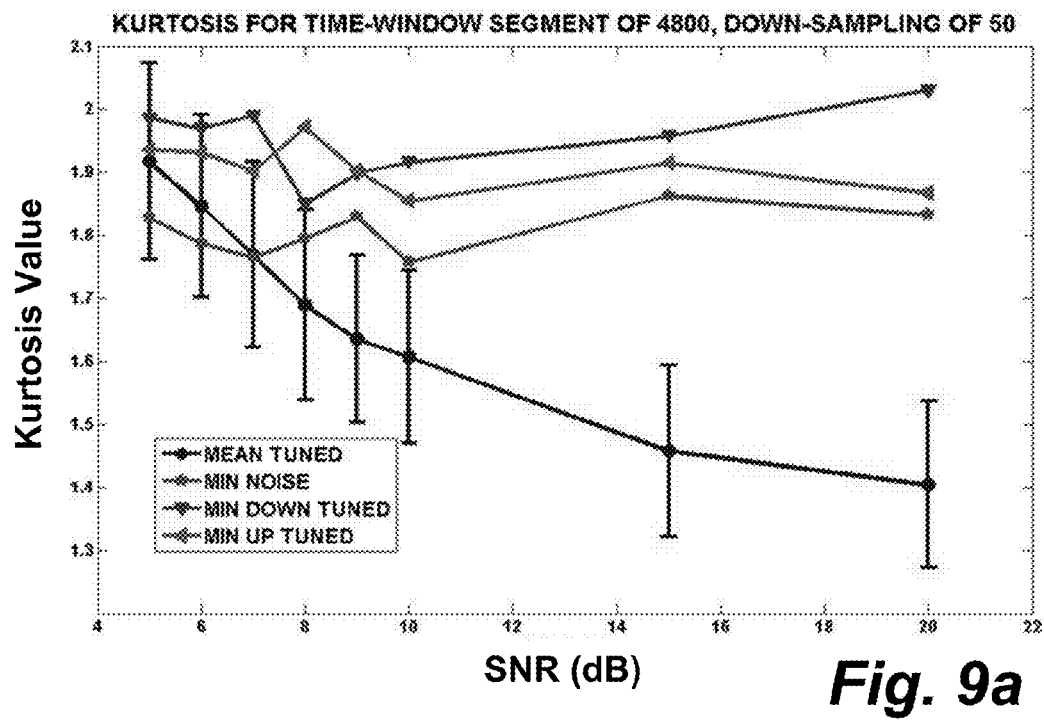
FIGS. 9a-9b are plots of a tuned kurtosis mean and standard deviation for various signals at different time windows and a down sample size of 50.
Figure 9B:
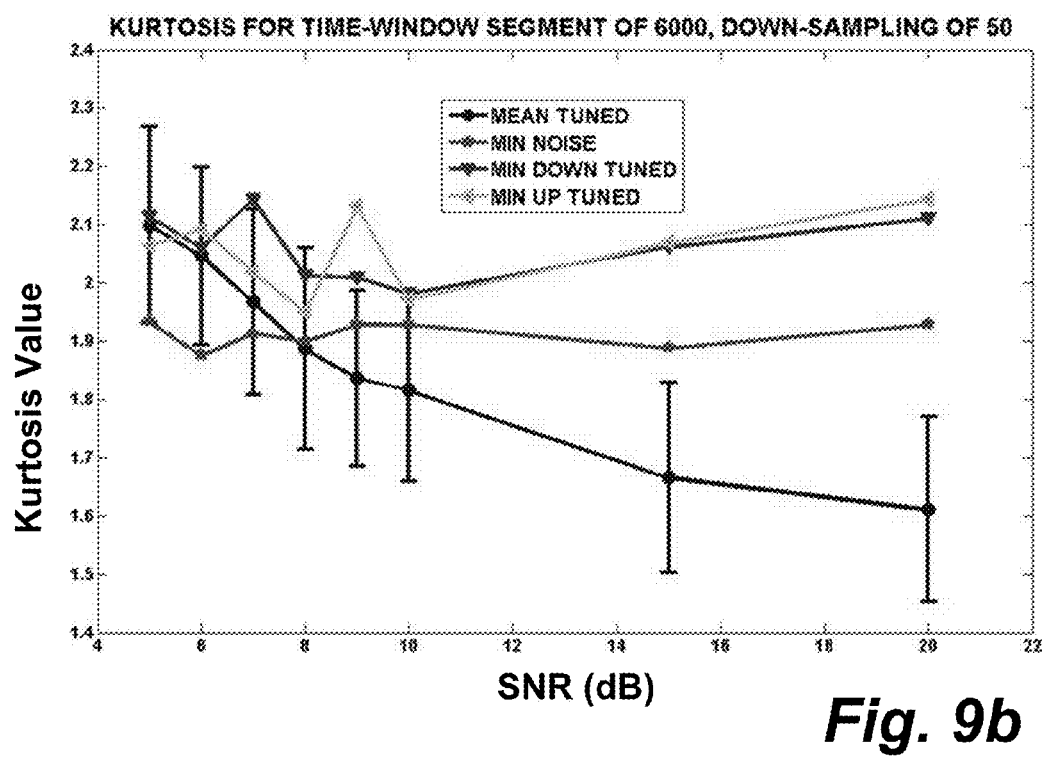

FIG. 7a is a plot of a tuned kurtosis mean and standard deviation for a down sample of 1 (no down sampling) and a summation limit of 4800. FIG. 7b is a plot of the tuned Kurtosis mean and standard deviation for a down sample of 1 (no down sampling) and a summation limit of 6000. FIG. 8a is a plot of the tuned Kurtosis mean and standard deviation for a down sample of 25 and a summation limit of 4800. FIG. 8b is a plot of the tuned Kurtosis mean and standard deviation for a down sample of 25 and a summation limit of 6000. FIG. 9a is a plot of the tuned kurtosis mean and standard deviation for a down sample of 50 and a summation limit of 4800. FIG. 9b is a plot of the kurtosis mean and standard deviation for a down sample of 50 and a summation limit of 6000. It appears that there is a significant separation between the tuned kurtosis curve and the off-tuned kurtosis curve. The noise kurtosis minimums fall between the tuned mean and off-tuned minimum curves. Better separation of the tuned curve and the noise curve is achieved with a 4800 summation limit. The intersection of the noise curve with the tuned curve occurs at a higher SNR as the down sampling increases.

In order to calculate the probabilities of detection and false alarms of corresponding to the example embodiment above, a set of Kurtosis thresholds were selected based on the plots in FIGS. 7a-9b. A second threshold based on the Variance may be included to provide enhanced performance. Variance signals were calculated over identical summation limits as the Kurtosis signals. A set of variance thresholds was selected based on observations of the tuned, off-tuned and noise variances, however, the kurtosis threshold only condition could be obtained by setting the variance threshold to zero. All the points in each trial whose kurtosis value fell below the Kurtosis threshold and whose variance exceeded the Variance threshold were identified. These points were classified as resulting from either a tuned, down-tuned or up-tuned hop or noise-only event. For all SNR values except 0 dB, there were 504 tuned hops and 252 down-tuned or up-tuned hops. The probability of detection at each SNR value was defined as the number of detected hops divided by 504. The probability of false alarm due from a down-tuned (up-tuned) hop was defined as the total number of down-tuned (up-tuned) hops detected divided by 252. The probability of a false alarm due to a noise only event was defined as the number trials having at least one noise event meeting both threshold conditions divided by the number of iterations.

Referring back to FIG. 4, that plot illustrates how the probability of detection increases with the Kurtosis threshold. The probability of false detection from detecting an off-tuned hop or noise only event also increases as the Kurtosis threshold increases. FIGS. 5a and 5b illustrate how requiring both a Kurtosis threshold and a Variance threshold allows one to increase the probability of detection without a corresponding increase in the probability of false alarm. The results in FIG. 4 where obtained with a down sample of 1 and a summation limit of 4800. This is identical to the conditions under which FIG. 7a was obtained. From FIG. 7a one can see that at a Kurtosis of threshold of 2.1 or 2.2 the probability of a noise only event falling below the Kurtosis threshold is quite high.

One reason for examining the Kurtosis is that the Kurtosis is independent of signal power and a power independent threshold could be developed. A Variance threshold is highly dependent on the signal power and no allowance was made in the above examples for large fluctuations in signal power. As another embodiment of the method 20, the Variance threshold may be scaled relative to the noise power.

Once all segments of the stored output signal 14 have been identified as either center-frequency-tuned, off-tuned, or noise, all the segments of the output signal 14 that are not center-frequency-tuned may be zeroed out to create a clean center-frequency-tuned signal. Once created, the clean center-frequency-tuned signal may be used for processing Time Difference of Arrival (TDOA) data and Frequency Difference of Arrival (FDOA) data.

In yet another embodiment of the method 20, the kurtosis threshold may further comprise an upper threshold and a lower threshold such that any given segment of the stored output signal 14 is only identified as center-frequency-tuned if the variance of the segment exceeds the variance threshold and the kurtosis falls between the upper and lower kurtosis thresholds. Signals with sharp rising and falling edges have high Kurtosis, while signals that rise and fall slowly have low Kurtosis. If multiple signal bursts from different emitters are present, Kurtosis might be able to tell which signal burst is from which emitter. Having upper and lower Kurtosis thresholds may prevent interfering signal bursts from being detected as a segment of a center-frequency-tuned signal.

From the above description of the method for distinguishing center-frequency-tuned signals from off-tuned signals and noise with a single-channel receiver, it is manifest that various techniques may be used for implementing the concepts of method 20 without departing from its scope. The described embodiments are to be considered in all respects as illustrative and not restrictive. It should also be understood that method 20 is not limited to the particular embodiments described herein, but is capable of many embodiments without departing from the scope of the claims.

We claim:

1. A method of distinguishing center-frequency-tuned signals from off-tuned signals and noise in a single-channel receiver, comprising the following steps:
   a. receiving a signal with the single-channel receiver and transforming the signal into an output signal;
   b. storing the output signal as a series of data points in a memory store;
   c. calculating the variance of a time-windowed segment of the stored output signal, wherein the variance equals the second central moment of the segment;
   d. storing data representing the variance of the segment in the memory store;
   e. calculating the kurtosis of the segment of the output signal, wherein the kurtosis equals the ratio of the fourth central moment to the variance squared minus three;
   f. storing data representing the kurtosis of the segment in the memory store;
   g. comparing the variance data and the kurtosis data to variance and kurtosis thresholds respectively;
   h. identifying the segment as center-frequency-tuned if the variance of the segment exceeds the variance threshold and the kurtosis falls below the kurtosis threshold; and
   i. identifying the segment as non-center-frequency-tuned if the variance of the segment is less than or equal to the variance threshold and/or the kurtosis is greater than or equal to the kurtosis threshold.

2. The method of claim 1, further comprising the step of:
   j. shifting the window one data point and repeating steps c-i.

3. The method of claim 2, further comprising the step of:
   k. repeating steps c-j until the last data point of the stored output signal is included in the window.

4. The method of claim 1, wherein the size of the window is approximately the length of an expected signal burst.

5. The method of claim 4, further comprising adjusting the kurtosis and variance thresholds based on expected characteristics of the signal burst.

6. The method of claim 5, wherein the kurtosis and variance thresholds are adjusted based on an estimated signal to noise ratio.

7. The method of claim 6, wherein the kurtosis threshold comprises an upper threshold and a lower threshold such that the segment is only identified as center-frequency-tuned if the variance of the segment exceeds the variance threshold and the kurtosis falls between the upper and lower kurtosis thresholds.

8. The method of claim 7, wherein the variance threshold is scaled to a noise power.

9. The method of claim 1, further comprising the step of:
   shifting the window a predetermined number of data points such that some data points are skipped and repeating steps c-i.

10. The method of claim 1, wherein the single-channel receiver is configured to receive center-frequency-tuned signals as well as portions of higher and lower hopped frequency signals.

11. The method of claim 1, further comprising down-sampling the output signal prior to calculating the kurtosis and variance.

12. The method of claim 1, further comprising the steps of:
   zeroing out all non-center-frequency-tuned segments of the output signal to create a clean center-frequency-tuned signal; and
   processing the center-frequency-tuned signal for Time Difference of Arrival (TDOA) data and Frequency Difference of Arrival (FDOA) data.

13. The method of claim 1, wherein the size of the window is approximately twice the length of an expected signal burst.

14. A method of identifying the presence of a center-frequency-tuned signal burst in an incoming signal without monitoring the energy level of the signal, comprising the following steps:
   a. transforming the incoming signal into a filtered signal by passing the incoming signal through a band-pass filter, wherein the band-pass filter is configured to pass center-frequency-tuned signals as well as portions of higher and lower hopped frequency signals;
   b. storing the filtered signal as a series of data points in a memory store;
   c. calculating the variance of a time-windowed segment of the filtered signal, wherein the variance equals the second central moment of the segment, and wherein the window length is approximately the length of an expected length of the signal burst;
   d. storing data representing the variance of the segment in the memory store;
   e. calculating the kurtosis of the segment of the signal, wherein the kurtosis equals the ratio of the fourth central moment to the variance squared;
   f. storing data representing the kurtosis of the segment in the memory store;
   g. comparing the kurtosis data and the variance data to a kurtosis threshold range and a variance threshold respectively, wherein the kurtosis threshold range comprises an upper threshold and a lower threshold;
   h. identifying the segment as a portion of a center-frequency-tuned signal burst if the variance of the segment exceeds the variance threshold and the kurtosis falls within the kurtosis threshold range; and
   i. identifying the segment as non-center-frequency-tuned if the variance of the segment is less than or equal to the variance threshold and/or the kurtosis lies outside the kurtosis threshold range.

15. The method of claim 14, further comprising the step of creating a clean center-frequency-tuned signal by zeroing out all segments of the filtered signal that are non-center-frequency-tuned.

* * * * *